United States Patent [19]

Floss

[11] 4,306,344

[45] Dec. 22, 1981

[54] FLEXIBLE DISC REINFORCING DEVICE FOR DISCS OF MULTIPLE SIZES

[75] Inventor: Joseph J. Floss, San Jose, Calif.

[73] Assignee: INMAC, Santa Clara, Calif.

[21] Appl. No.: 146,032

[22] Filed: May 2, 1980

[51] Int. Cl.[3] .............................................. B23P 19/04

[52] U.S. Cl. ........................................ 29/238; 29/278; 29/235

[58] Field of Search ............ 29/235, 280, 278, 243.52, 29/229, 238

[56] References Cited

U.S. PATENT DOCUMENTS

| | | | |
|---|---|---|---|
| 2,860,535 | 11/1958 | Fowler | 29/280 |
| 2,877,070 | 3/1959 | Lee | 29/235 |
| 3,030,700 | 4/1962 | Jensen | 29/235 |
| 4,184,241 | 1/1980 | Gunther et al. | 29/278 |

*Primary Examiner*—James L. Jones Jr.

*Attorney, Agent, or Firm*—Martin R. Greenstein

[57] ABSTRACT

A tool is provided which enables one to place a reinforcing ring on both standard and miniature flexible magnetic discs. By a simple reversal of the parts two sizes of discs can be accommodated.

1 Claim, 4 Drawing Figures

FLEXIBLE DISC REINFORCING DEVICE FOR DISCS OF MULTIPLE SIZES

SUMMARY OF THE INVENTION

Flexible magnetic discs have become indispensible in a number of computer and other applications of memory devices. Such discs consist of a flexible plastic backing material with magnetic particles thereon. The discs are placed in a drive and rotated at a relatively high rate of speed while a read or write head moves over the surface of the disc. The discs are normally enclosed in a jacket and rotate within the jacket.

Although the drive is a precision instrument, the drive is sensitive to several factors which can cause it to slightly or even permanently damage the flexible disc. One problem is the improper insertion of the disc which causes erratic movement of the disc inside the jacket. The disc may slip on the drive and the center hole may become elongated so that the clamping hub or the drive may tear the disc's inner hole. In extreme cases, the magnetic coating may be dimpled or even removed when the disc hits the drive spindle. This may cause the loss of valuable data by the improper rotation of the disc as well as preventing reuse of a disc which may be erased and reused many times.

In order to prevent the above difficulties, it has been proposed to provide a reinforcing ring for the central hole which fortifies the disc and makes it much stronger. It has been found in practice that by the use of such reinforcement, the life of a disc may be actually tripled.

The reinforcing rings are ordinarily made of strong paper or even plastic and are provided with a pressure sensitive surface on one side which is protected prior to use by a backing paper. Frequently such reinforcing rings take the form of two or more concentric rings on a backing sheet so that more than one size of disc can be protected from a single supply of reinforcing rings.

In order to secure concentricity and also a good seal between the disc and the reinforcing ring, it is common to provide a centering tool which is used in conjunction with a pressure ring so that the reinforcing ring is accurately positioned and pressured securely in place.

The difficulty with such tools in the past has been that more than one size of disc is frequently used in the computer industry. For instance it is common to employ both a standard floppy disc and a minifloppy so that it is ordinarily necessary to provide separate tools for the different sizes of magnetic discs.

In accordance with the present invention, a multiple purpose tool is provided so that only a single tool is necessary to handle two sizes of discs.

Various other features and advantages of the invention will be brought out in the balance of the specification.

DESCRIPTION OF THE PREFERRED EMBODIMENTS

Figure 1:
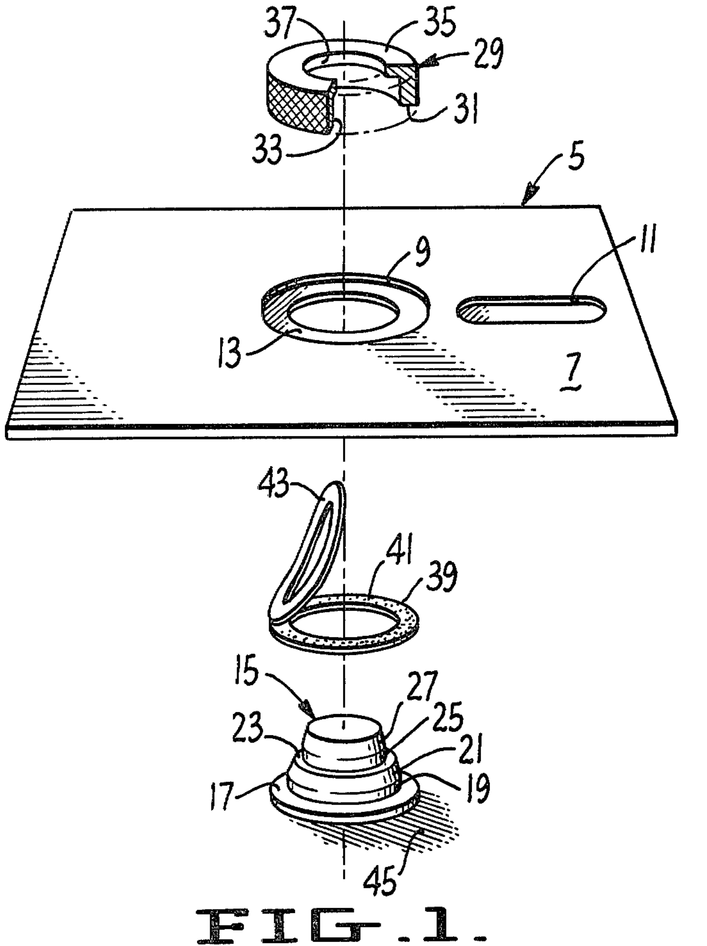
FIG. 1 is a perspective exploded view showing the tool of the present invention in use on a standard floppy disc.
Figure 3:
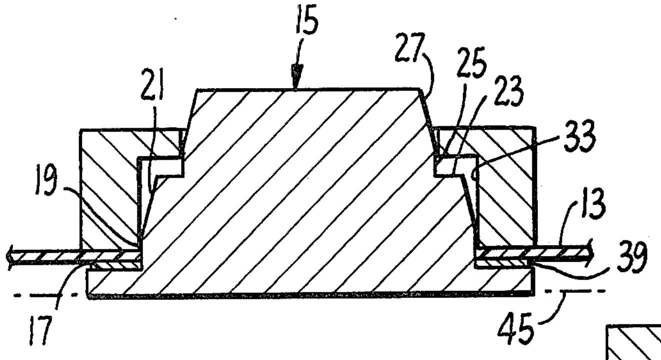
FIG. 3 is a section through the center of the tool, showing its use on a standard floppy disc.

Referring now to the drawings by reference characters and particularly FIGS. 1 and 3, the present invention is applicable to standard flexible magnetic discs generally designated 5. Such discs include an envelope 7 with a central round opening 9 and an elongated opening 11. The disc proper is enclosed within the envelope 7 and the central opening 9 permits the clamping hub of the drive, not shown, to engage the disc proper 13 and rotate the disc. The magnetic portion of the disc exposed in the slot 11 which serves to accommodate the read-write head.

As we previously mentioned, such discs are frequently subject to tearing or distortion and it is the object of the present invention to provide a device for accurate placement and pressing of a reinforcing ring at the center of the disc. For this purpose there is provided a centering tool generally designated 15 having a first flat surface 17 thereon, said surface being formed by the upstanding first round shoulder 19. It will be understood that the size of the shoulder 19 corresponds to the opening of the magnetic disc. Preferably there is a tapering surface 21 located immediately above shoulder 19. On the tool there is formed a second round flat surface 23 which is defined by second round shoulder 25. The shoulder 25 corresponds with the diameter of the hole of a miniature floppy disc as is later explained. Preferably there is a tapered surface 27 above the ring portion 25.

The mating portion of the tool is a pressure ring generally designated 29. This has a flat surface 31 of a size to mate the flat surface 17 and an inner cylindrical portion 33 which forms a slip fit over the shoulder portion 19. The upper portion of the pressure ring is provided with a flat surface 35 and an inner hole 37, the hole 37 corresponding in size to the shoulder 25.

To use the device of the present invention it is necessary to provide a reinforcing ring and ordinarily these take the form of a ring 39 which may be made of tough paper or plastic with a pressure sensitive adhesive 41 on one side thereof and with discardable backing paper 43. The backing paper 43 does not stick with any great strength to the pressure sensitive adhesive 41 and may be readily stripped off and serves only to protect the pressure sensitive layer from contact with other materials. Although it forms no part of the present invention, a plurality of the protective rings may be attached to a single sheet of backing paper and, in some instances, concentric rings may be formed of different sizes to accommodate different sizes of discs.

The method of employment of the tool on a standard floppy disc is shown in FIGS. 1 and 3. First the tool 15 is placed on a flat surface 45. Now one takes a reinforcing ring 39 and places it with the adhesive 41 up on the rim 17 as is best seen in FIG. 3. Now one takes the disc 7 and places it down over the applicator or centering tool whereupon it will be guided into accurate alignment so that the center hole 13 of the disc will be lined up with the center of the reinforcing ring 39. Now one places the pressure ring 29 down over the assembly so that the ring 39 is accurately centered upon and firmly attached to the magnetic disc. This completes the operation.

Figure 2:
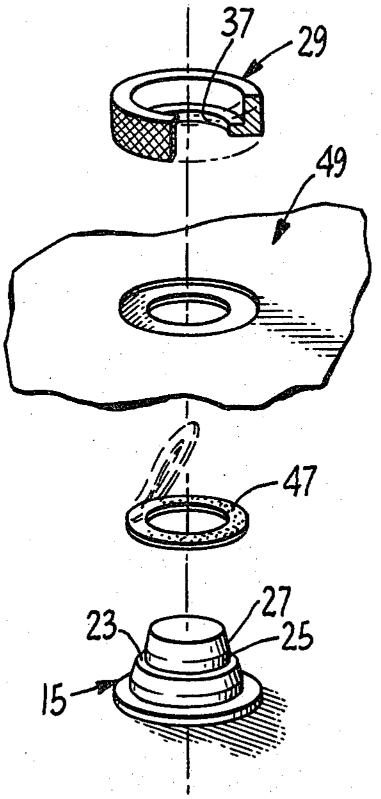
FIG. 2 is a view, similar to FIG. 1 showing the tool in use on a minifloppy disc.
Figure 4:
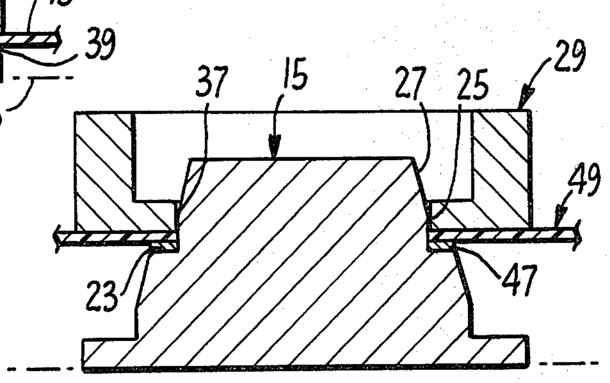
FIG. 4 is a similar section showing the tool in use on a minifloppy disc.

If one has a minifloppy disc the pressure ring 29 is merely reversed as is shown in FIGS. 2 and 4. Here tool 15 is placed as before and a reinforcing ring, of smaller size designated 47 is placed over the centering tool but, because of its smaller size it rests upon the flat surface 23. Now the minidisc, generally designated 49 is placed over the centering tool and the pressure ring 29, which has now been turned over is brought down upon the assembly. It will be apparent that hole 37 now lines up with the smaller shoulder 25 so that again the reinforcing ring is accurately located and firmly pressed in place.

In illustrating the use of the invention, it has been assumed that the reinforcing ring is placed on the centering tool with the adhesive side up. A less preferred method of utilizing the tool would be to place a disc on the centering tool first and then place the reinforcing ring, with the protective backing removed, with the adhesive down on top of the disc. Although this method can be used, it is less convenient and requires more dexterity than placing the reinforcing ring on the tool initally. Also, it will be apparent that in many instances one might apply the rings to both sides of the disc rather than employing a single enforcing ring as shown.

Although a preferred embodiment of this invention has been described, it will be apparent to those skilled in the art that many variations can be made without departing from the spirit of this invention.

I claim:

1. A tool for applying reinforcing rings to two different sizes of flexible magnetic discs, each having a central round hole, comprising in combination:

a. a centering tool including,
  (1) a first flat surface having a first central, round, elevated shoulder,
  (2) said first shoulder having a diameter corresponding to the hole in a large magnetic disc,
  (3) a second flat surface above and supported by said first shoulder and having a second smaller, round central shoulder,
  (4) said second shoulder corresponding to the hole in a smaller magnetic disc, b. a pressure ring having flat surfaces on each side thereof, each with a central opening, one corresponding in size to the first shoulder and the other corresponding in size to the second shoulder, whereby:

c. said pressure ring is adapted to press against the first flat surface of the centering tool and turned over to press against the second flat surface of the centering tool.

* * * * *